(No Model.)

D. FITZ GERALD.
FILTERING APPARATUS.

No. 359,249. Patented Mar. 15, 1887.

WITNESSES.
Charles Carr
D. N. B. Coffin

INVENTOR.
Desmond Fitzgerald

UNITED STATES PATENT OFFICE.

DESMOND FITZ GERALD, OF BROOKLINE, MASSACHUSETTS.

FILTERING APPARATUS.

SPECIFICATION forming part of Letters Patent No. 359,249, dated March 15, 1887.

Application filed December 16, 1886. Serial No. 221,805. (No model.)

*To all whom it may concern:*

Be it known that I, DESMOND FITZ GERALD, of Brookline, in the county of Norfolk and State of Massachusetts, have invented certain new and useful Improvements in Filtering Apparatus, of which the following is a specification.

The nature of my invention relates to the construction, arrangement, and combination of parts, substantially as hereinafter more fully set forth.

It consists, mainly, of the devices for providing a continuous and moderate or retarded supply, adapted to the gradual percolation of the water through the filtering material, of the sponge-guard or strainer-chamber, as illustrated at C, and the various devices and features of construction, whereby the filtration is made gradual and complete, the limited pressure of the water through the filtering material is secured, the filtering material drained and aired, and whereby the parts are made conveniently accessible and the filtering material easily removable and easily readjusted, &c., as I will proceed to describe.

My invention is illustrated in the accompanying drawings, which, with the letters of reference thereon, form a part of this specification.

Figure 1:
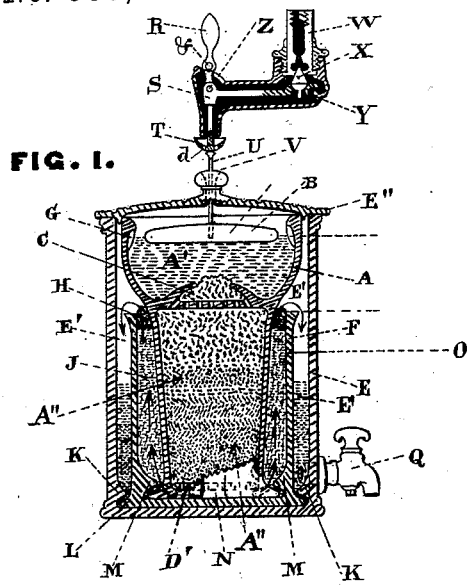
Figure 6:
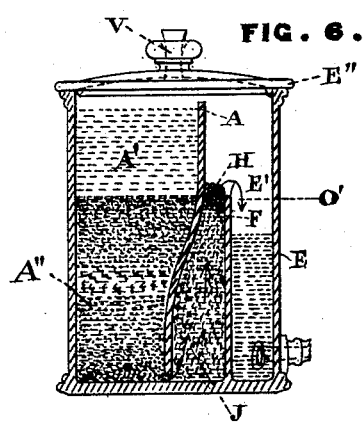
Figure 4:
Figure 5:
Figure 2:
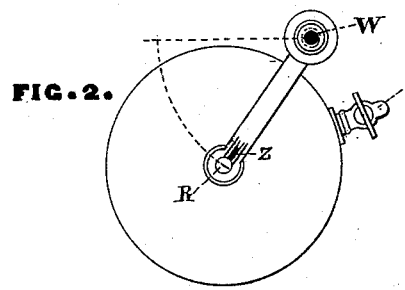
Figure 12:
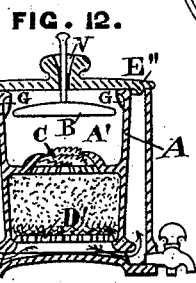
Figure 7:
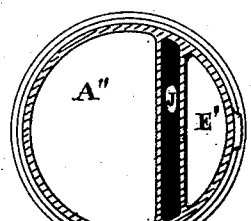
Figure 10:
Figure 3:
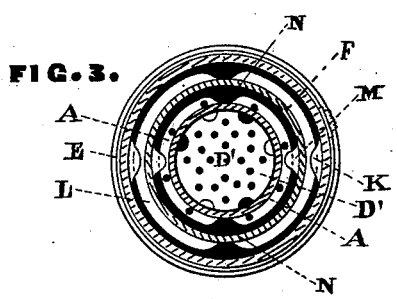
Figure 11:
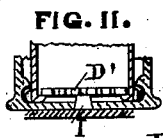
Figure 9:
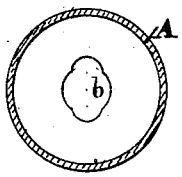
Figure 8:
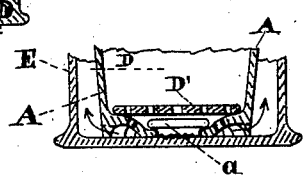

Of the drawings, Figure 1 is a vertical central sectional view, partly in elevation. Fig. 2 is a plan. Fig. 3 is a sectional plan, the plane of section being shown at O, Fig. 1. Fig. 4 is a plan of lever S, &c. Fig. 5 is a plan of cup or foot T and section of its stem. Fig. 6 is a vertical central section corresponding to Fig. 1, but showing a very much simplified modification embodying some of the features of my improvements. Fig. 7 is a sectional plan section at O', Fig. 6. Fig. 8 is a vertical central section illustrating one of the variations of the construction shown in Fig. 1 in fastening part A within part F and E. Fig. 9 is a sectional plan of part A of same. Fig. 10 is a plan of part *a* of the same. Fig. 11 is a vertical central sectional elevation of parts A, &c., showing a drainage and ventilating hole and a stopper, I. Fig. 12 is a central sectional elevation of a simplified modification of the construction shown in Fig. 1, the intermediate compartment, F, being omitted.

Like letters refer to the same or corresponding parts in all the figures.

In Fig. 1 is shown a jar or compartment, A, having the reservoir A', upon or in the bottom of which is a chamber at C, for holding fibrous, sponge, or other strainer material, through which the grosser materials cannot pass. The bottom of chamber C is perforated to allow the strained water to pass. Beneath the bottom of chamber C and reservoir A' is a chamber containing filtering material of any desired gradation as to stratification and fineness and of any desired kind and quality. This filtering-material chamber is provided with a suitable removable perforated bottom, D', with suitable fastening slots and lugs, as illustrated in Figs. 1 and 3. For filling, this bottom is taken out, the filtering material inserted in inverted position, and the bottom replaced. The part A has handles G, and a rim at the bottom with slots, (see Fig. 3,) by which it is locked within the jar or compartment F by means of lugs M, as shown.

The jar or compartment F is simple, as shown, and has also the outer rim and slots for fastening it within compartment E by means of lugs K. This compartment F is also filled, in like manner to chamber A'', with filtering material around part A, and at its top is packed with fibrous or other suitable material, so as to retain or confine any more granular material used below. This compartment F, being smaller than the outer compartment or jar, E, leaves space around it within jar or compartment E for filtered water, and a faucet, Q, is provided, through which to draw it off.

At W is a nozzle representing the connection to the water-supply. About this nozzle, fitted with a stuffing-box, is made to swivel the pipe-arm, as shown in Figs. 1 and 2, containing the valve X and lever S. To the end of lever S is jointed a stem having on its lower end the cup or foot T, which has perforations *d* near its center.

A handle, R, passing through the slot Z, has a pin or shoulder, and so that when thrown to the left, as shown, it holds the lever up and the valve X in closed position. When thrown to the right, it allows the lever to fall and valve X to open.

A float, B, in supply-reservoir A' has a stem passing loosely or freely through cover E″, directly under the cup T, when that is in position for operation. The lever S has a fulcrum at Y.

The operation is as follows: The handle R being thrown to the right, the valve X opens and allows the water to flow or trickle through the swivel pipe-arm and fall into cup T, by which it is guided, passing through its perforated central part to the tunnel-shaped opening V in the cover E″ into the supply-reservoir A′. When the water rises to the height indicated in Fig. 1, the float B is made to lift cup T and lever S, thereby closing valve X until the process of filtration has allowed the water in reservoir A′ to fall, so permitting the float to be lowered and the outer end of lever S to fall, so opening valve X and permitting the water again to flow, as before, into the supply-reservoir A′. From thence it passes through the sponge or other strainer material in the sponge-chamber C and the perforations in its bottom, and is thereby distributed to the filtering material in the top of chamber A″. It will here be noticed that the sponge-chamber C is preferably raised somewhat relatively to the bottom of reservoir A′. Consequently, when so raised, much of the impurities contained in the water to be filtered will settle around chamber C on the bottom of reservoir A′, and thus the strainer will be relieved from much duty, and will be prevented from clogging up and requiring so frequent cleaning as it otherwise would. From the perforated bottom of chamber C the water percolates downward through the filtering material in chamber A″, and through the perforated plate D′. From this, in Fig. 1, it passes, through perforations in the bottom rim of A and its loose joint with F, to the upward-flow filtration-chamber J, through which it rises and overflows the top of compartment F into the delivering-chamber E′, from which it is drawn out for use. This description of operation also applies in the main to the modification shown in Fig. 6.

In Fig. 12 the water passes from the perforations in plate D′, through grooves or notches under the bottom rim of A, directly to an adjacent delivering-chamber.

In Fig. 11 is illustrated a ventilating and drainage hole and stopper, I, which is to be made in part F, and opened whenever the filtering apparatus is to be unused. By this means the filtering material is drained and the air admitted to it for the purposes of ventilation and purification.

The reservoir A′ may of course be filled by hand; but it is much better to employ the swivel pipe-arm, &c., as illustrated in Figs. 1 and 2, which affords a steady and gradual supply. The reservoir A′ is then placed near the supply-pipe, and, as illustrated in Fig. 2, the swivel pipe-arm is swung over it and the foot T is placed directly over the float-stem.

On ceasing to use the apparatus, or if it is desired to remove or take apart the filter-compartments, it is swung to the side, as illustrated in Fig. 2.

Let it be observed, with reference to Fig. 1, that the second or upward flow filtration-chamber limits the head of water, and proportionately the pressure, to the depth of the receiving-reservoir, or thereabout, so causing the process of filtration to progress slowly, and consequently very perfectly, and this without regard to the depth of water accumulated in the delivery-reservoir.

In the modification illustrated in Fig. 12 the head and, consequently, the pressure of water through the filtering material, and so the filtering process and its completeness, is directly affected and made to vary by the varying depth of water likely to occur from the irregular drawing off of the filtered water from the delivery-reservoir. In this respect this modification is inferior to the construction illustrated in Fig. 1. It, however, has this compensating advantage — viz., the simple opening of the faucet and leaving it open causes the filtering material to be drained and ventilated. It is so kept pure when unused and from freezing injuriously in cold weather without taking apart.

I claim—

1. The filtering apparatus as constructed— viz., having the receiving-reservoir, its centrally-perforated cover, float, float-stem, pendent cap or foot and stem, lever, fulcrum, swivel pipe-arm, valve, and nozzle W, in combination, substantially as described.

2. In a filtering apparatus, the compartment A, as constructed—viz., having the reservoir A′, perforated sponge-chamber C, and filtration-chamber A″, all formed in one piece and provided with a cover, and a removable perforated bottom, D′, and a locking-rim to engage with an inclosing-compartment, substantially as described.

3. In a filtering apparatus, a jar or vessel as constructed—viz., having in one piece the reservoir A′, the diaphragm or bottom in which is formed a sponge-chamber, C, and a filtering-medium chamber beneath, in combination with a perforated removable bottom, D′, in the base of filtering-chamber A″, and inclosing-vessel with engaging-rim, substantially as described.

4. In a filtering apparatus, the combination of the receiving-reservoir, float, swivel pipe-arm, valve, lever, and cam-lever R, and with suitable connecting parts, substantially as described.

DESMOND FITZ GERALD.

Witnesses:
ALEX. BEAL,
D. N. B. COFFIN.